United States Patent [19]

Lopez

[11] Patent Number: 5,156,642
[45] Date of Patent: Oct. 20, 1992

[54] FLUID DISTRIBUTION MANIFOLD WITH CIRCULARLY ARRANGED OUTPUT PORTS

[76] Inventor: Robert Lopez, 2060 E. Locust, #D, Ontario, Calif. 91761

[21] Appl. No.: 745,745

[22] Filed: Aug. 16, 1991

[51] Int. Cl.5 .............................................. F16L 55/18
[52] U.S. Cl. ..................................... 137/15; 137/269; 137/561 A
[58] Field of Search ................ 137/561 R, 561 A, 269

[56] References Cited

U.S. PATENT DOCUMENTS

| | | | |
|---|---|---|---|
| 2,787,138 | 4/1957 | Boyle | 137/561 R |
| 3,169,098 | 2/1965 | Leavitt | 137/561 R |
| 3,520,315 | 7/1970 | Dobrikin | 137/269 |
| 3,864,938 | 2/1975 | Hayes, Jr. | 137/561 A |
| 4,256,140 | 3/1981 | Swaroop et al. | 137/561 A |
| 4,284,243 | 8/1981 | Shaner | 137/561 A |
| 4,512,368 | 4/1985 | Kaminaka et al. | 137/561 A |
| 4,688,599 | 8/1987 | Zeman | 137/561 A |

*Primary Examiner*—A. Michael Chambers
*Attorney, Agent, or Firm*—Robert N. Schlesinger

[57] ABSTRACT

This invention relates to a fluid distribution manifold, where the input piping is inserted in through the manifold's circular intake opening and into its cylindrical intake port. The manifold's intake port has an intake restraint rim on its inner surface in order to prevent the intake piping from being inserted too far into the manifold. In some embodiments, the manifold also has a glue trap located below the intake restraint rim, and of approximately the same dimensions and geometry as the intake restraint rim. The manifold's intake port leads to a cup- or parabola-shaped intake reservoir, where fluid is briefly housed prior to its distribution through several distribution output opening, and their respective distribution outlet ports. In some embodiments, the manifold's distribution outlet ports each possess an output restraint rim on the inner surface of each of the distribution outlet ports, to prevent the output piping from being inserted too far into the port. In a preferred embodiment, the manifold is constructed of polyvinyl chloride or acylonitrile-butadiene-styrene, and is used to distribute fluids, such as water and ozone, in spas and hydrotherapy baths.

14 Claims, 5 Drawing Sheets

FLUID DISTRIBUTION MANIFOLD WITH CIRCULARLY ARRANGED OUTPUT PORTS

BACKGROUND

1. Field of the Invention

This invention was invented and devised by Robert Lopez, and relates to a manifold device with a circular intake opening where the input plumbing or piping is inserted in through the circular intake opening and into the cylindrical intake section or port of the manifold. In some embodiments of the present invention, there is an intake restraint notch, band, or rim, one or more inches from the circular intake opening, and on the interior of the intake port, to assist the assembler in properly fitting the input plumbing or piping into the intake port, and to prevent over-insertion of the plumbing or piping into the port. The circular intake opening leads through a cylindrical path, forming the intake port, to six circular distribution outlets, arranged in a circle (or hexagon). The six circular distribution outlets each form a cylindrical path to form six distribution outlet ports, which may be used for the forced distribution of the fluid from the intake port. In some embodiments of the present invention, the distribution outlet ports may have an output restraint notch, band, or rim, located on the inner surface of each of the distribution outlet ports, in order to assist the assembler in properly fitting the output plumbing or piping into the distribution outlet ports, and to prevent over-insertion of the plumbing or piping into the ports. In some embodiments of the present invention, there may also be another circular distribution outlet and its distribution output port, located at the center of the circular arrangement of distribution outlets and their ports; i.e., located equidistant from the circular (or hexagonal) arrangement of distribution outlets and their ports.

2. Description of the Prior Art

A primary application of this invention is to distribute the water or ozone fluids used in spas. The fluid which enters the intake port is divided and distributed in the present manifold invention's six circular distribution outlets. The six distribution outlets each form a cylindrical distribution outlet port. These distribution outlet ports are each attached to an independent plumbing or piping distribution line which, when used in the spa or hydrotherapy baths, each generally has a jet affixed to its termination end.

The forced water used in prior art spas is pumped to the various water jets in-line and in-series. This plumbing of the spa's water jets in-line through one main pipe making a circuit around the spa to each of the jets in-series, causes a significant variance between the water pressure emanating from, e.g., the first water jet in the series and the last water jet in the series. This variance in the water pressure is mechanically troublesome because it may cause premature breakdown of the first water jet in the circuit or plumbing, functioning under the greatest pressure. This variance in water pressure is also mechanically troublesome because a problem in the plumbing line or a water jet may cause a functional breakdown in the other water jets further down-line. For example, a line blockage may cause a breakdown in the function of the water jets down-line, or a fully open water jet may reduce the water pressure at the water jet sites down-line to an essentially nonfunctioning state. Variance in water pressure at the water jet sites is also a distraction and may be an annoyance to the persons using the spa.

Heretofore, the systems used in the spa industry use in-line and in-series plumbing of water and of air to the various jets in spas and hydrotherapy baths. These jets generally require six glue joints, which thereby increase glue cure time, spa production time, quality control time, spa production costs, and increase the potential failure rate in the spas and hydrotherapy baths. The present manifold invention allows the spa jet to be installed using only two glue joints; one at the fitting and connection of an output plumbing or piping line with the distribution outlet port (4), and the other at the fitting and connection between terminal end of the output plumbing or piping line and the spa jet's water intake port.

In trying to solve these industry disadvantages and problems, and within the scope of this objective, it was surprising to find that a solution to these disadvantages and problems need not be expensive or extremely difficult to install or maintain.

The objectives and advantages of the present invention are:

1) The water pressure at the various water jet sites would be more uniform and have less variability, thereby making the present invention superior to existing systems.

2) The manifold may be fitted with the various plumbing lines prior to the actual spa assembly process.

3) The manifold with the fitted plumbing lines may be pressure checked prior to the actual spa assembly process.

4) There would be a significant reduction or in some embodiments, an elimination of the gluing process in this aspect of the spa assembly process.

5) Manufacturing assembly of the water plumbing lines in spas would be easier, quicker, and more efficient, and this increased efficiency would lead to a significant cost reduction.

6) The multiport water distribution manifold and its plumbing system could be used with a corresponding multiport air distribution manifold, to feed air to the water jets and to the air jets in spas.

7) The multiport water distribution manifold affords the spa designer the option of affixing control mechanisms to the independent water plumbing lines leading to each water jet, which may vary the flow rate or cause the flow rate to pulsate, thereby causing a pulsative flow in selected jets, which may be desirable in, e.g., hydrotherapy spas and baths.

Further objects, features, and advantages of the present invention will become more apparent from the following description when taken with the accompanying drawings which show, for purposes of illustration only, an embodiment construction in accordance with the present invention.

DRAWING FIGURES

The drawings reflect the best embodiment of the fluid distribution manifold, as is intended for use in spas, but is not limited to such use.

REFERENCE NUMERALS IN THE DRAWINGS

Figure 1:
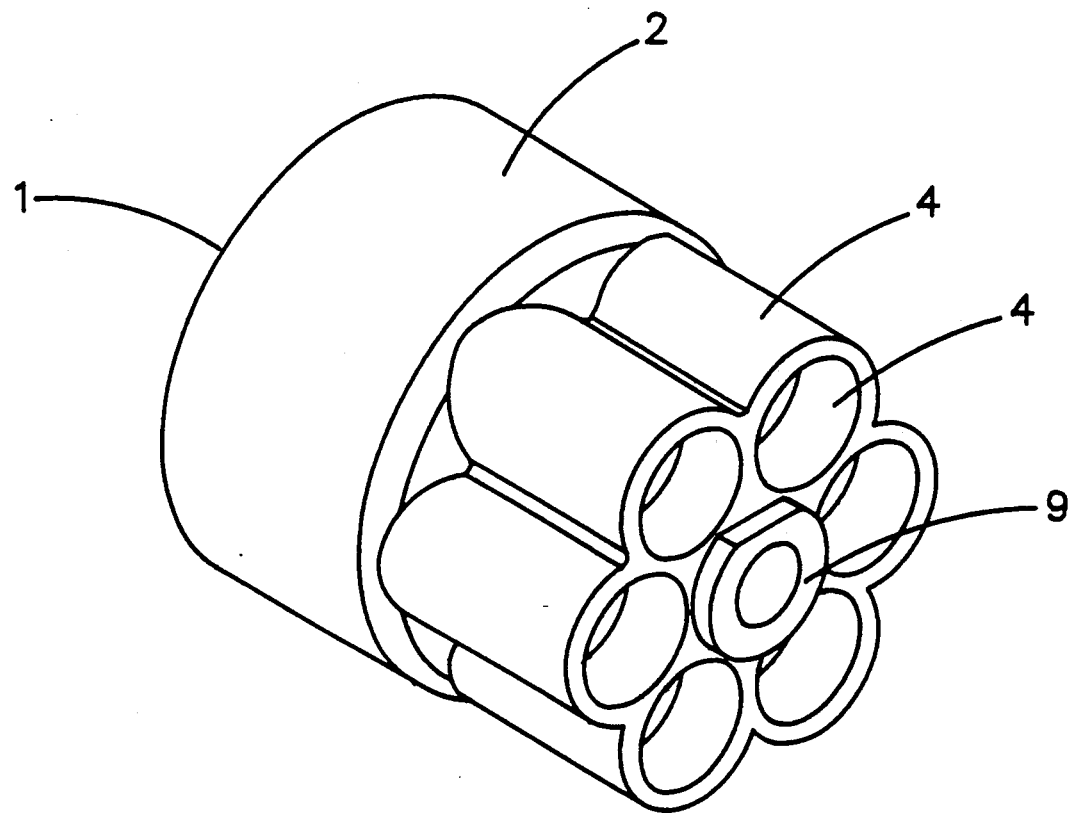
FIG. 1 shows an isometric side view of the manifold.

Referring now to the drawing figures, like reference numerals are used to refer to like specific parts of the various Figures. The reference numerals used to describe the various parts of the Figures follows.

1. Circular intake opening (1), forming the intake end of the manifold.
2. Intake port (2), which receives the intake plumbing or piping.
3. Distribution output openings (3), where fluid, such as water, flows prior to forced distribution through the openings (3) and their respective outlet ports (4).
4. Distribution outlet ports (4), where fluid, such as water, is forced through the port (4) to the attached or affixed output plumbing for distribution to their respective jets.
5. Intake restraint rim (5), where the intake port (2) may effectively come to an end, due to this protruding notch, band, or rim around the inner surface of the intake port (2); this intake restraint rim (5) allows the spa assembler to properly fit the intake piping or plumbing fully into the intake port (2), thereby preventing the spa assembler from fitting the intake piping or plumbing too far into the intake port (2) or from not fitting sufficient piping or plumbing into the intake port (2).
6. Output restraint rim (6), where the distribution outlet port effectively begins in the manifold, due to this protruding rim around the inner surface of each of the distribution output ports (4); this output restraint rim (6) allows the spa assembler to properly fit the output piping or plumbing fully into each of the distribution output ports (4), thereby preventing the spa assembler from fitting the output piping or plumbing too far into a distribution outlet port (4) or from not fitting sufficient piping or plumbing into the distribution output port (4).
7. Intake reservoir (7), where fluid from the intake plumbing or piping is briefly housed, prior to forced entry in through the manifold's distribution output openings (3), and out through their respective distribution outlet ports (4). This intake reservoir (7) may, in some embodiments, be shaped like a circular cup or a parabola, with the distribution output openings (3) located on the base or bottom of the intake reservoir (7). In addition to the fluid mechanical utility of the intake reservoir (7), the intake reservoir (7) has the added utility, if desired, of being a mixing area for fluids, prior to their distribution through the various distribution outlet ports (4).
8. Glue trap (8), where glue from the process of gluing output plumbing or piping into the distribution outlet ports (4), is trapped and prevented from entering the distribution output openings (3) and their respective distribution outlet ports (4).
9. Plugged optional distribution outlet port (9), where in the standard embodiment of the present manifold invention, a seventh distribution outlet port (4) may be formed or drilled-out in the center of the circular arrangement of distribution outlet ports (4) and equidistant from each of the ports in the circular arrangement of distribution outlet ports (4). The plugged optional distribution outlet port (9) has the same approximate internal diameter and port length, so that it may be adapted for use as a seventh distribution outlet port. This plugged optional distribution outlet port (9) has the added utility of making the tooling of the manifold easier and less costly by providing a centrally located port-like structure on the manifold, e.g., by saving the plastic which might be used to fill-in the plugged optional distribution outlet port (9), in the manufacturing process.

DESCRIPTION OF A PREFERRED EMBODIMENT.

Referring now to the drawing figures, the reference numerals used to describe the various parts of the invention are shown in parenthesis following mention of the part in the text herein. Like reference numerals are used to refer to like specific parts in the various Figures.

Figure 2:
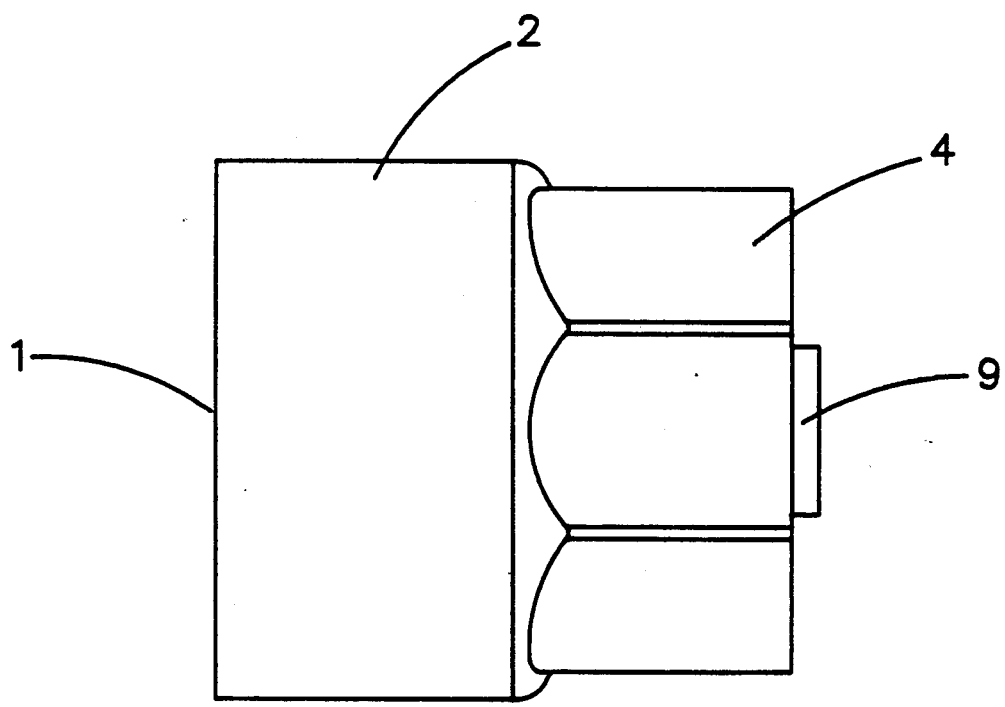
FIG. 2 shows a side view of the manifold.
Figure 3:
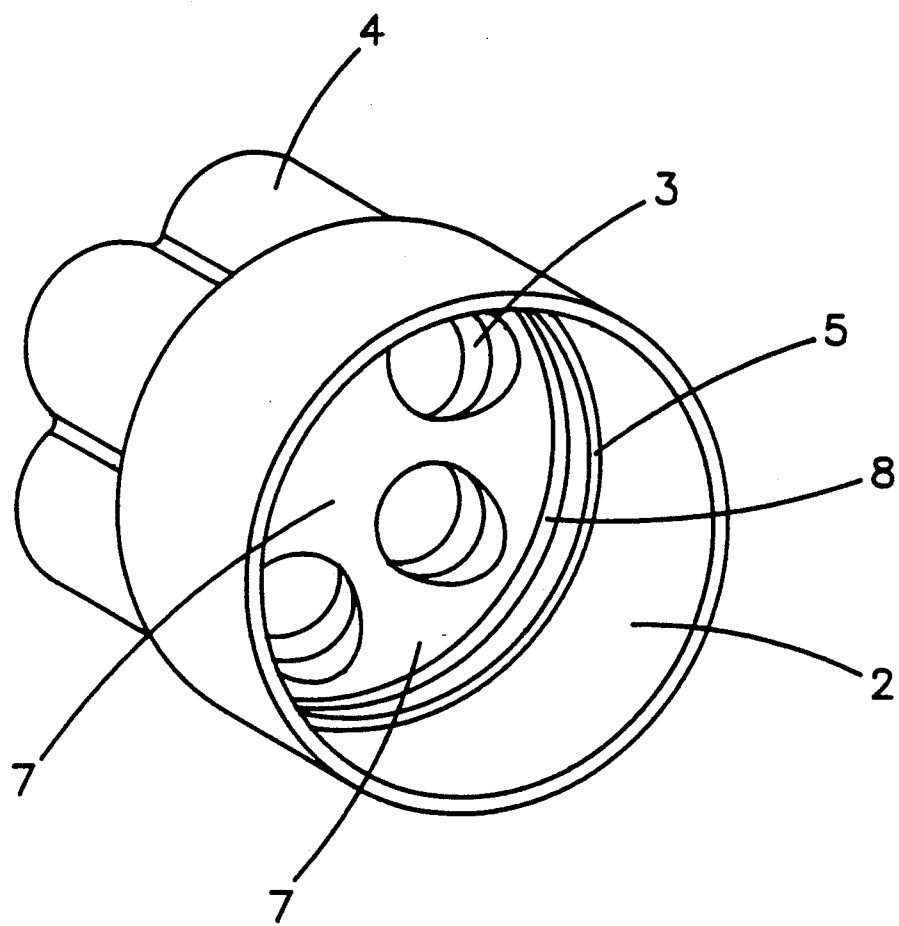
FIG. 3 shows an isometric view from the input end of the manifold.
Figure 4:
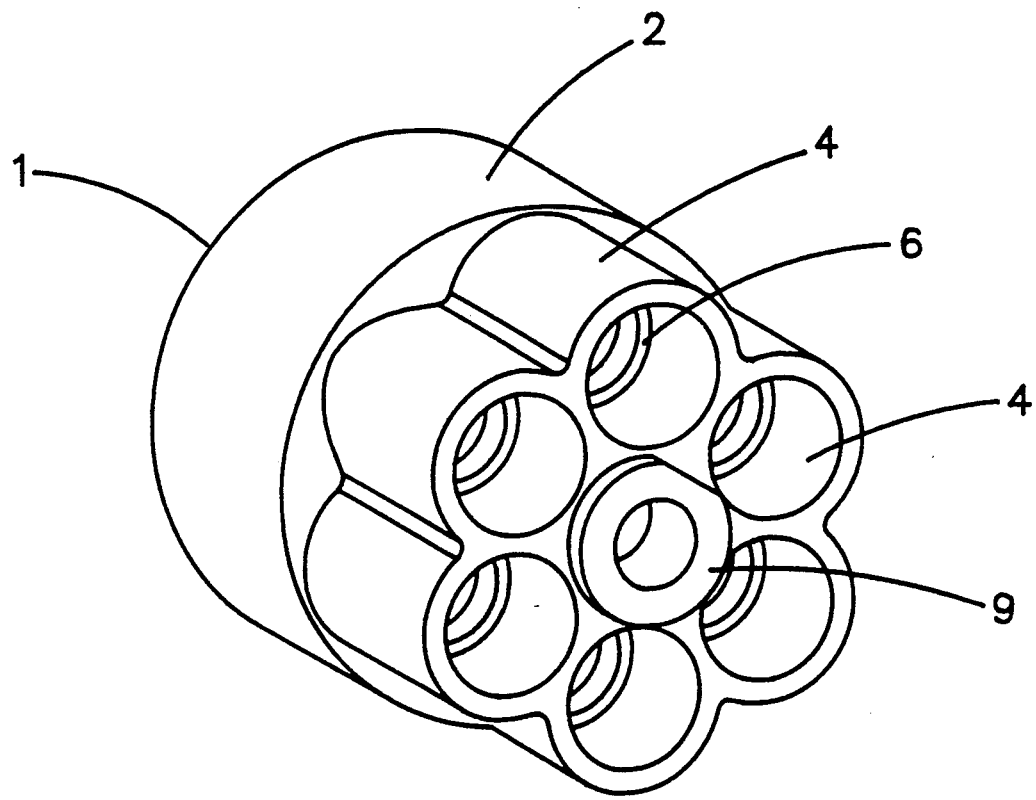
FIG. 4 shows an isometric view from the output end of the manifold.
Figure 5:
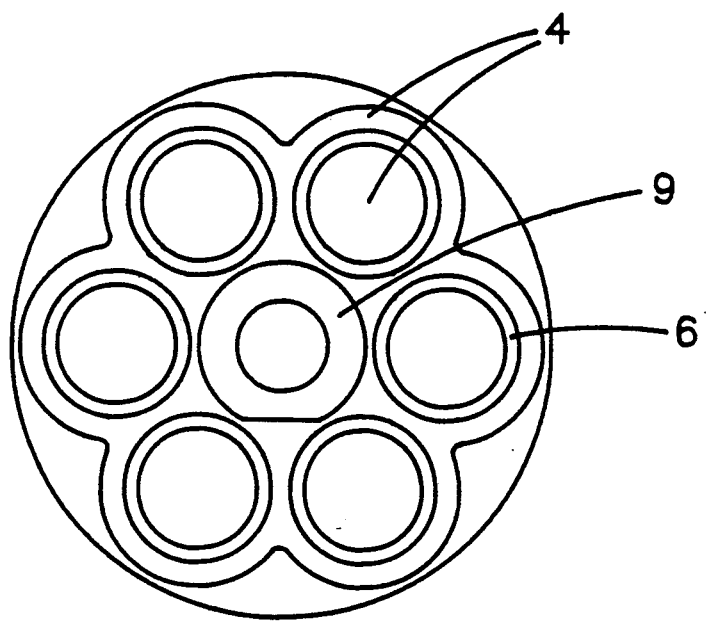
FIG. 5 shows a view from the output end of the manifold, when the center distribution output port is plugged and thereby not utilized.

In a simple embodiment of the fluid distribution manifold, as shown in FIGS. 1 through 5, inclusive, where the manifold has six distribution output ports (4) arranged in a circle (or hexagon), and where a seventh distribution output port (9) may be located in the center of the circle, equidistant from the six distribution outlet ports (4), if the plugged optional distribution outlet port (9) is drilled-out or if its respective distribution output opening (3) is formed in the tooling or re-tooling process. In this simple embodiment, fluid intake plumbing or piping is inserted in through the manifold's circular intake opening (1) and into the manifold's intake port (2), until the intake plumbing or piping meets the intake restraint rim (5), located on the inner surface of the intake port (2). The intake plumbing or piping is then glued or otherwise affixed and attached to the manifold (e.g., FIG. 1). If the intake plumbing or piping is glued into the intake port (2), excess glue from this gluing process may be trapped in the glue trap (8), and thereby prevented from entering the distribution output openings (3) and their respective distribution outlet ports (4). Fluid emanating from the intake plumbing or piping then flows into the circular intake reservoir section (7) of the manifold, and then through the manifold's circular distribution output openings (3), to the opening's (3) respective distribution outlet port (4). Output plumbing or piping is attached into each of the manifold's distribution outlet ports (4), until the output plumbing or piping meets the output restraint rim (6), located on the inner surface of each of the distribution outlet ports (4).

In some simple embodiments, there may exist a structure appearing to be a seventh distribution outlet port (9), located in the center of the circle of six distribution outlet ports (4). This plugged optional distribution outlet port (9) may be added to simplify the tooling for the manufacture of the manifold (e.g., FIG. 1), to reduce the cost in plastic for the manifold's manufacture, and the plugged optional distribution outlet port (9) may be drilled-out to form a seventh distribution output opening (3), and it's respective distribution outlet port (9).

A preferred embodiment, which may be used in spas which use industry standard three inch input plumbing and industry standard ¾ inch output plumbing on the manifold, has the following approximate dimensions:

1. Circular intake opening (1): approximately 3.5 inches inner diameter and approximately 3.825 inches outer diameter.
2. Intake port (2): approximately 3.5 inches in diameter, as in the inner diameter of the circular intake opening (1), supra, and approximately 1.5 inches in depth, to the intake restraint rim (5), infra.
3. Distribution output openings (3): each are approximately 1.6 inches inner diameter to the output restraint rim (6), infra.

4. Distribution outlet ports (4): each are approximately 1.125 inches in inner diameter along the approximately one inch long cylindrical inner surface of the port (4) to the output restraint rim (6), infra; the distribution outlet ports (4) are each approximately one inch in length to the output restraint rim (6).

5. Intake restraint rim (5): approximately 0.07 inch wide, from the rim's edge to the intake port's (2) inner wall surface.

6. Output restraint rim (6): each approximately 0.1 wide, from the rim's edge to the distribution outlet port's (4) inner wall surface.

7. Intake reservoir (7): approximately 3.5 inches in diameter; the intake reservoir (7) may be in a cupped or parabolic-like shape, with the distribution output openings (3) located on the base of the cupped or parabolic shaped reservoir (7), which is approximately 0.3 inch deep on its perimeter, which is the shallowest point, and is approximately one inch deep at its deepest point in the center of this reservoir (7).

8. Glue trap (8): approximately 0.05 inch wide, from the trap's edge or rim to the intake port's (2) inner wall surface.

9. Plugged optional distribution outlet port (9): approximately the same inner diameter and port length as the distribution outlet ports (4). The plugged optional distribution outlet port (9) does not have an associated distribution output opening (3), and if the port (9) is to be utilized, an opening must be machined, cut or drilled-out, or the tooling for the manifold must be re-tooled.

In a preferred embodiment, which may be used in spas, which also use industry standard three inch input plumbing, but use industry standard ½ inch output plumbing on the manifold, the manifold dimensions are approximately the same as the preferred embodiment using the ¾ inch output plumbing, described above, except this embodiment has: 1) distribution output openings (3) which are approximately 0.84 inch in inner diameter to the output restraint rim (6) and 2) distribution outlet ports (4) and a plugged optional distribution outlet port (9) which is approximately 0.852 inch in inner diameter along the approximately one inch long cylindrical inner surface wall of the port (4) to the output restraint rim (6).

In another embodiment of the present invention, a manifold with, e.g., four distribution outlet ports may be desired. In this case, the six-port manifold (e.g., FIG. 1) may be used with two of the distribution outlet ports (4) plugged. The distribution outlet ports (4) may be plugged by a variety of means, such as, e.g., through the use of glued inserts in the distribution outlet ports (4) or by inserting a piping into the distribution outlet port (4) with an optional cut-off valve, to thereby reduce the number of operating output ports (4) on the manifold (e.g., FIG.1).

In another embodiment of the present invention, a manifold as described above, with an industry standard three inch intake opening (2), may be used in a system which has industry standard two inch plumbing. In this embodiment, a flow reducer may be used by inserting and glueing or sealing an industry standard three inch to two inch piping reducer into the intake port (2) of the manifold with an industry standard three inch intake port (2).

In another embodiment of the present invention, a manifold as described above, with industry standard ¾ inch distribution outlet ports, may be used in a spa or hydrotherapy system where certain special jets are optimally required to have a reduced flow rate, such as, e.g., special jets for stimulating the neck region of a human body. In this embodiment, a flow reducer may be used by inserting and glueing or sealing an industry standard ¾ inch to ½ inch reducer into the desired distribution outlet ports (4), which lead to the special reduced flow jets.

In another embodiment of the present invention, a manifold with, e.g., twelve distribution output ports (4) may be desired. Another means of achieving this result is by fitting the intake piping or plumbing, which normally is fitted and glued into the manifold's intake port (2), into a T-joint pipe or a Y-joint pipe, and then to fit and glue each of the two manifolds (e.g., FIG. 1), each manifold (FIGS. 1 through 5, inclusive) having six distribution outlet ports (4), onto each two ends of the T-joint pipe or Y-joint pipe. This configuration has the added advantage of affording the fluid exiting the distribution outlet ports (4) a more uniform fluid pressure, and consequently, a more uniform fluid pressure at the jet site, when used in spas and hydrotherapy baths. Manifold configurations with many distribution outlet ports (4) in one line, may experience a decline in fluid pressure as a function of how far down line the distribution outlet port (4) is located.

The various embodiments of the manifold invention described above may be constructed of a polymeric or plastic material, such as polyvinyl chloride or acrylonitrile-butadiene-styrene, when used in spas and hydrotherapy baths.

While I have shown and described in this disclosure only selected embodiments in accordance with the present invention, it is understood that the same is not limited thereto, but is susceptible to numerous changes and modifications as known to one having ordinary skill in the art, and I therefore do not wish to be limited to the details shown and described herein, but intend to cover all such modifications, changes, additions, and eliminations, as are encompassed by the scope of the appended claims.

I claim:

1. In a spa, a method for evenly distributing a pressurized liquid fluid from a main inlet pipe to a plurality of spa jets, comprising the steps of:
   (a) connecting the main inlet pipe in fluid communication to a manifold, wherein the manifold comprises:
   (1) a body having opposing first and second end walls and defining an enclosed intake reservoir, the intake reservoir having an intake reservoir central axis, the transverse cross-section of the intake reservoir central axis being circular in shape;
   (2) a cylindrically shaped intake port disposed in the first end wall and having an intake port central axis, the intake port being disposed such that the intake port central axis and the intake reservoir central axis are substantially coincident, the intake port being in fluid communication with the intake reservoir, and the intake port being capable of receiving the inlet pipe; and
   (3) a plurality of cylindrically shaped outlet ports, each having an outlet port central axis, each being disposed in the second end wall, and each being in fluid communication with the intake reservoir, the diameter of the cross-section of each of the outlet ports being smaller than the diameter of the cross-section of the intake port, the outlet port central axis of each of the outlet ports being parallel and equally spaced around a circle which is centered on the intake reservoir central axis, the outlet ports being capable of receiving the plurality of outlet pipes;

(b) connecting each of the spa jets in fluid communication to an outlet port of the manifold;

(c) passing the liquid fluid from the main inlet pipe through the manifold intake ports and out the manifold outlet ports; and (d) directing the fluid from each of the outlet ports to a corresponding spa jet;

wherein the main inlet pipe is connected to the intake port.

2. A device useful for distributing liquid fluids such as water, from one inlet pipe to a plurality of outlet pipes, the device comprising:

(a) a body having opposing first and second end walls and defining an enclosed intake reservoir, the intake reservoir having an intake reservoir central axis and the transverse cross-section of the intake reservoir central axis being circular in shape;

(b) a cylindrically shaped intake port disposed in the first end wall and having an intake port central axis and the intake port being disposed such that the intake port central axis and the intake reservoir central axis are substantially coincident, the intake port being in fluid communication with the intake reservoir, and the intake port being capable of receiving the inlet pipe; and (c) a plurality of cylindrically shaped outlet ports, each having an outlet port central axis, each being disposed in the second end wall, and each being in fluid communication with the intake reservoir, the diameter of the cross-section of each of the outlet ports being smaller than the diameter of the cross-section of the intake port, the outlet port central axes being parallel to one another and equally spaced around a circle which is centered on the intake reservoir central axis, the outlet ports being able to receive the plurality of outlet pipes;

wherein the outlet pipes do not extend into the intake reservoir.

3. The device of claim 2 wherein an intake restraint rim is disposed between the intake port and the intake reservoir, the intake restraint rim having the shape of a hollow cylinder with an inside diameter of the cross-section of the intake restraint rim being smaller than the diameter of the cross-section of the intake port, the intake restraint rim also having an intake restraint rim central axis which is substantially coincident with the intake port central axis.

4. The device of claim 3 wherein a glue trap is located between the intake restraint rim and the intake reservoir, the glue trap having a cylindrical shape and a glue trap central axis, the diameter of the cross-section of the glue trap being greater than the diameter of the cross-section of the intake restraint rim, and the glue trap central axis being substantially coincident with the intake port central axis.

5. The device of claim 2 wherein the intake reservoir has a longitudinal cross-section which is parabola-shaped.

6. The device of claim 2 wherein a plurality of output restraint rims are located between the intake reservoir and each of the outlet ports, each outlet restraint rim having (i) a hollow cylinder shape, (ii) with an inside cross-section of radially reduced diameter than the cross-section of each outlet port, and (iii) an outlet restraint rim central axis which is substantially coincident with the corresponding outlet port central axis.

7. The device of claim 2 wherein the plurality of output ports is six.

8. The device of claim 7 further comprising a cylindrically shaped plugged optional distribution outlet port having the same cross-section diameter as the six output ports, the plugged optional distribution outlet port central axis being substantially coincident with the intake port central axis, the intake reservoir being not open to the plugged optional distribution port outlet and the plugged optional distribution port being not in fluid communication with the intake reservoir.

9. A device useful for distributing liquid fluids such as water, from one inlet pipe to six outlet pipes, the device comprising:

(a) a body having opposing first and second end walls and defining an enclosed intake reservoir, the intake reservoir having an intake reservoir central axis, and the transverse cross-section of the intake reservoir central axis being circular in shape;

(b) a cylindrically shaped intake port disposed in the first end wall and having an intake port central axis, the intake port being disposed such that the intake port central axis and the intake reservoir central axis are substantially coincident, the intake port being in fluid communication with the intake reservoir, and the intake port being capable of receiving the inlet pipe; and (c) six cylindrically shaped outlet ports, each having an outlet port central axis, each being disposed in the second end wall, and each being in fluid communication with the intake reservoir, the diameter of the cross-section of each of the outlet ports being smaller than the diameter of the cross-section of the intake port, the outlet port central axis of each of the outlet ports being parallel and equally spaced around a circle which is centered on the intake reservoir central axis, the outlet ports being able of receiving the six outlet pipes;

wherein the six outlet pipes do not extend into the intake reservoir.

10. The device of claim 9 wherein an intake restraint rim is disposed between the intake port and the intake reservoir, the intake restraint rim having the shape of a hollow cylinder with an inside diameter of the cross-section of the intake restraint rim being smaller than the diameter of the cross-section of the intake port, and the intake restraint rim also having an intake restraint rim central axis which is substantially coincident with the intake port central axis.

11. The device of claim 10 wherein a glue trap is located between the intake restraint rim and the intake reservoir, the glue trap having a cylindrical shape and an glue trap central axis, the diameter of the cross-section of the glue trap being greater than the diameter of the cross-section of the intake restraint rim, the glue trap central axis being substantially coincident with the intake port central axis.

12. The device of claim 9 wherein the intake reservoir has a longitudinal cross-section which is parabola shaped.

13. The device of claim 9 wherein six output restraint rims are located between the intake reservoir and each of the outlet ports, each outlet restraint rim having (i) a hollow cylinder shape, (ii) with an inside cross-section of radially reduced diameter than the cross-section of each outlet port, and (iii) an outlet restraint rim central axis which is substantially coincident with the corresponding outlet port central axis.

14. The device of claim 9 further comprising a cylindrically shaped plugged optional distribution outlet port having the same cross-section diameter as the six output ports, the plugged optional distribution outlet port central axis being substantially coincident with the intake port central axis, the intake reservoir not being open to the plugged optional distribution port outlet and the plugged optional distribution port not being in fluid communication with the intake reservoir.

* * * * *